(12) United States Patent
Lau et al.

(10) Patent No.: US 8,471,430 B2
(45) Date of Patent: Jun. 25, 2013

(54) ELECTRIC MOTOR

(75) Inventors: James Ching Sik Lau, Hong Kong (CN); Xiao Jun Yang, Shenzhen (CN); Chun Kei Yu, Hong Kong (CN)

(73) Assignee: Johnson Electric S.A., Murten (CH)

( * ) Notice: Subject to any disclaimer, the term of this patent is extended or adjusted under 35 U.S.C. 154(b) by 148 days.

(21) Appl. No.: 12/980,873

(22) Filed: Dec. 29, 2010

(65) Prior Publication Data

US 2011/0156526 A1    Jun. 30, 2011

(30) Foreign Application Priority Data

Dec. 29, 2009   (CN) .......................... 2009 1 0238809
Nov. 8, 2010   (CN) .......................... 2010 1 0550978

(51) Int. Cl.
    *H02K 1/18*        (2006.01)

(52) U.S. Cl.
    USPC ..................... 310/216.129; 310/91

(58) Field of Classification Search
    USPC ....... 310/402, 91, 216.219, 89, 216.001–137, 310/216.114, 216.115, 216.116, 216.118, 310/216.122, 216.127, 216.129, 216.131, 310/216.133, 216.134, 421, 422, 427, 432, 310/217
See application file for complete search history.

(56) References Cited

U.S. PATENT DOCUMENTS

| | | | |
|---|---|---|---|
| 4,618,791 | A | 10/1986 | Morrill et al. |
| 4,952,828 | A | 8/1990 | Yu-fang et al. |
| 6,232,687 | B1 | 5/2001 | Hollenbeck et al. |
| 6,734,584 | B1 | 5/2004 | Browne et al. |
| 7,462,965 | B2 | 12/2008 | Natsuhara et al. |
| 7,541,701 | B2 * | 6/2009 | Lin et al. .......................... 310/58 |
| 2003/0011257 | A1 * | 1/2003 | Akemakou ....................... 310/91 |
| 2006/0267430 | A1 * | 11/2006 | Archer et al. ..................... 310/89 |
| 2007/0284954 | A1 * | 12/2007 | Lin et al. .......................... 310/58 |
| 2008/0315694 | A1 | 12/2008 | Hamada |
| 2009/0134726 | A1 | 5/2009 | Hoyt |
| 2009/0160276 | A1 | 6/2009 | Ley |

* cited by examiner

*Primary Examiner* — Tran Nguyen
*Assistant Examiner* — Leda Pham
(74) *Attorney, Agent, or Firm* — Muncy, Geissler, Olds & Lowe, PLLC

(57) ABSTRACT

An electric motor includes a stator and a rotor rotatably installed in the stator. The stator has a stator core and windings. The stator core has a yoke and a plurality of teeth extending inwardly from the yoke. The stator includes two end caps disposed at opposite axial ends thereof and a plurality of locking members securing the end caps to the stator core. The windings are wound on the respective teeth, and the locking members extend between the end caps through gaps formed between adjacent teeth.

16 Claims, 6 Drawing Sheets

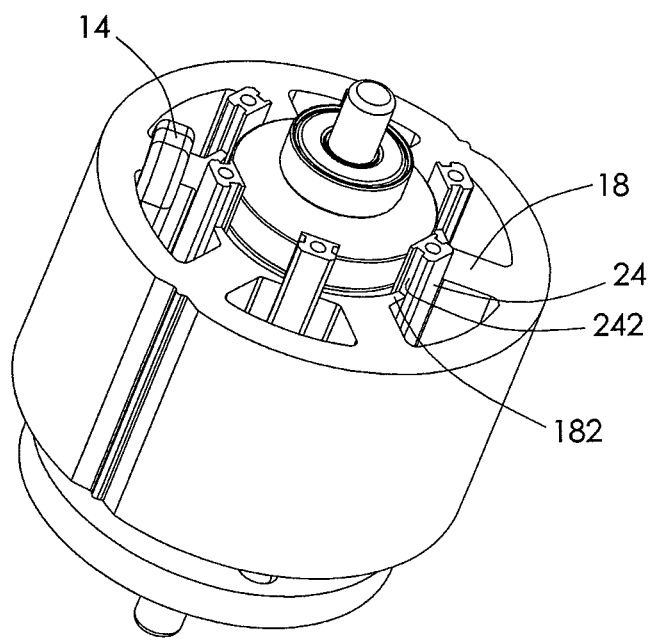
FIG. 11
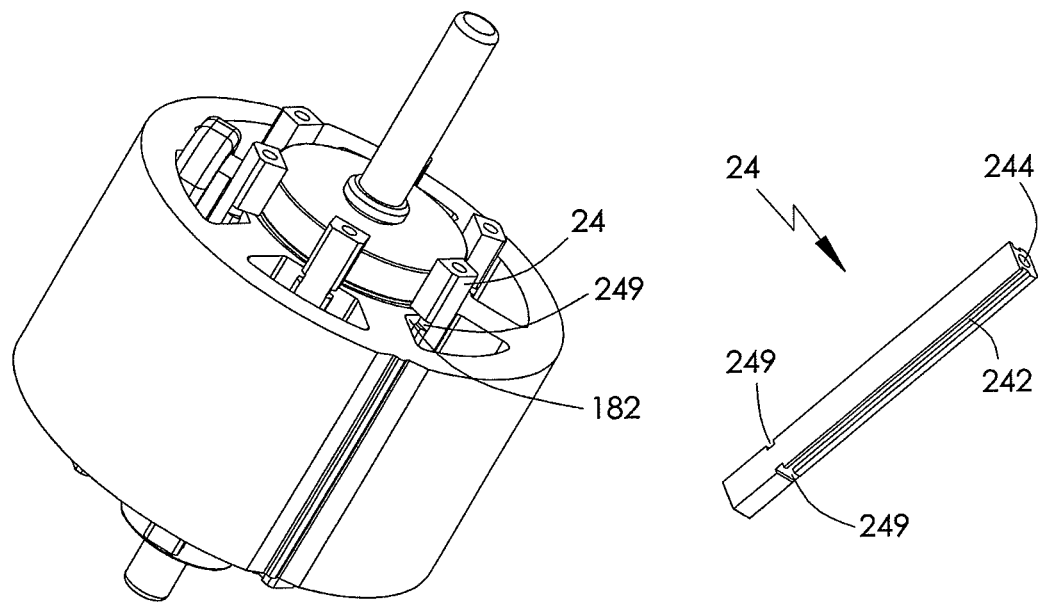
FIG. 12
FIG. 13

ELECTRIC MOTOR

CROSS REFERENCE TO RELATED APPLICATIONS

This non-provisional patent application claims priority under 35 U.S.C. §119(a) from Patent Application No. 200910238809.7 filed in The People's Republic of China on Dec. 29, 2009, and Patent Application No. 201010550978.7 filed in The People's Republic of China on Nov. 8, 2010.

FIELD OF THE INVENTION

This invention relates to an electric motor and in particular, to a small electric motor which may be used for electric appliances such as power tools.

BACKGROUND OF THE INVENTION

A stator of a traditional electronically commutated motor usually comprises a pair of end caps located at opposite axial ends thereof and four bolts located outside of the stator and fixed to the end caps at four spaced locations thereof. A cooling fan is typically located inside the stator within one of the end caps.

However, the bolts located outside of the stator occupy extra space, which is contrary to the trend of miniaturization. Furthermore, the size of the fan located inside the stator is limited by the size of the end caps, which limits the cooling capability of the fan.

SUMMARY OF THE INVENTION

Hence there is a desire for a motor with good heat management in a small package.

Accordingly, in one aspect thereof, the present invention provides an electric motor comprising a stator, including a stator core, a rotor, including a shaft, rotatably installed in the stator, a pair of end caps disposed at opposite axial ends of the stator core and a plurality of locking members fixing the end caps with respect to the stator core, the locking members extending between the end caps inside of the stator core.

Preferably, the rotor further comprises a fan attached to the shaft, the fan being disposed at one end of the stator outside the corresponding end cap.

Preferably, the stator core has channels formed in an outer surface thereof and the fan is an axial fan with a diameter greater than that of the stator core such that a part of the air flow generated by the fan flows along the outer surface of the stator core.

Preferably, the stator core comprises a yoke and a plurality of teeth extending inwardly from the yoke and the stator comprises windings, the windings being wound about respective teeth of the stator core and the locking members extending through slots formed between adjacent teeth.

Preferably, the stator further comprises two end protectors disposed at opposite axial ends of the stator core for insulating the stator core from the windings.

Preferably, the stator further comprises a circuit board disposed between one of the end caps and the corresponding end protector, the circuit board has through holes and the end protector has posts inserted in the corresponding through holes.

Preferably, the teeth have pole shoes formed at the inner ends thereof, the locking members being located in gaps formed between the poles shoes of adjacent teeth.

Preferably, the locking members are elongate pins which have grooves in opposite sides thereof, edges of the pole shoes being received in corresponding grooves of the locking members.

Preferably, the locking members have at least one transverse position slot cooperating with an axial end of the pole shoe to position the locking members in the axial direction of the motor.

Preferably, the locking members have locking holes, the end caps have through holes corresponding to the locking holes and fasteners extend through the through holes and engage with the corresponding locking holes.

Preferably, each end cap comprises a mounting portion and a plurality of extension portions extending from the mounting portion, the mounting portion defines a hole configured to mount therein a bearing for supporting the shaft of the rotor, and opposite ends of each locking member are respectively attached to the corresponding extension portions.

Preferably, each extension portion of the end cap has an opening for fixedly receiving one end of the corresponding locking member.

Preferably, joints between the locking members and the end caps are respectively located at corners of a regular polygon.

Preferably, each end cap further comprises at least one position part bent from each of the extension portions, the position parts abutting a corresponding axial end of the stator core.

Preferably, the axial ends of the stator core each form a step to position the corresponding position part in the axial and radial directions.

Preferably, the motor is an electronically commutated motor or a universal motor.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The FIG. 1 illustrates an electric motor in accordance with a preferred embodiment of the present invention;

FIG. 11 shows the motor of FIG. 10 with one end cap thereof removed;

FIG. 12 shows the motor of FIG. 11, with both end caps removed and viewed from the other end; and FIG. 13 shows a locking pin of the motor of FIG. 10.

DETAILED DESCRIPTION OF THE PREFERRED EMBODIMENTS

Figure 1:
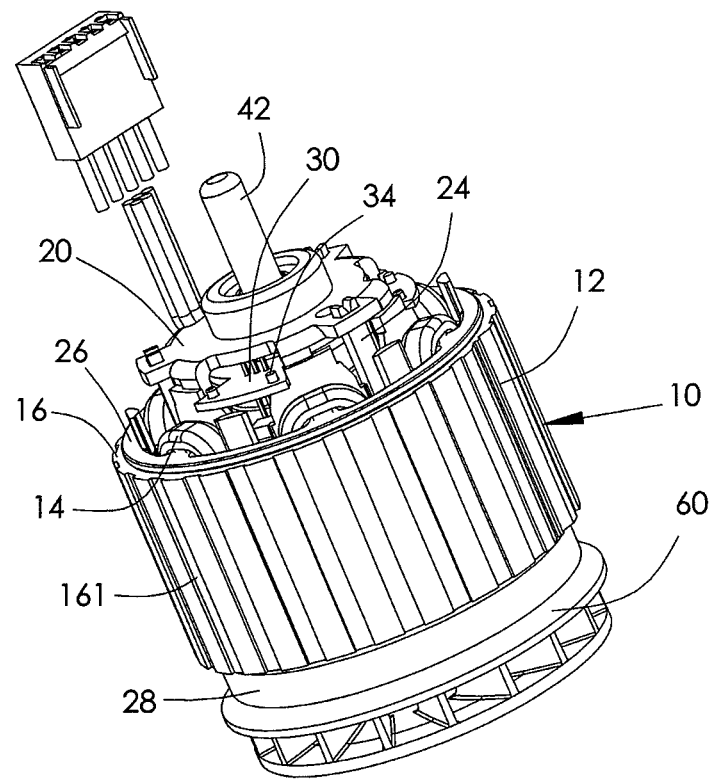
Figure 2:
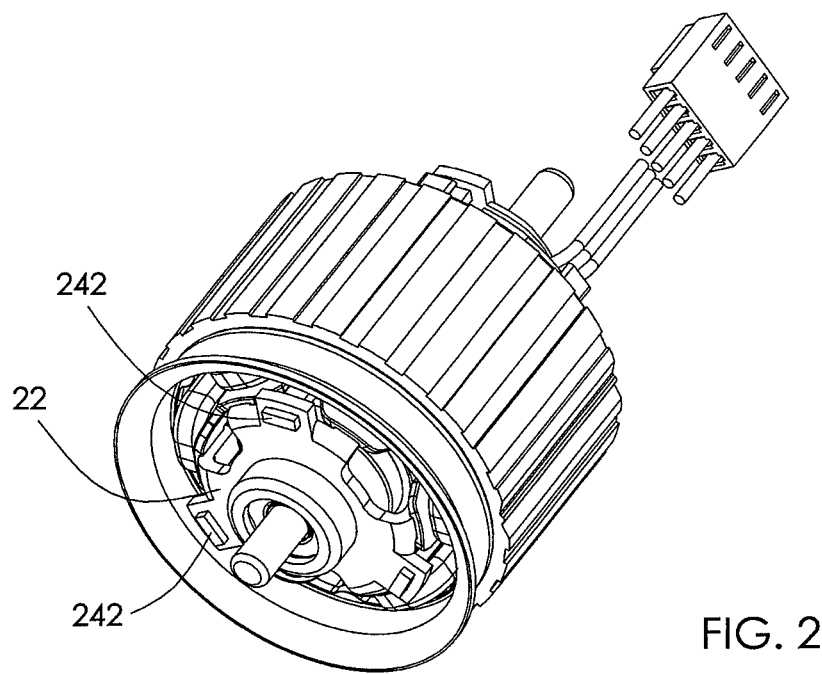
FIG. 2 shows the motor from another angle.
Figure 3:
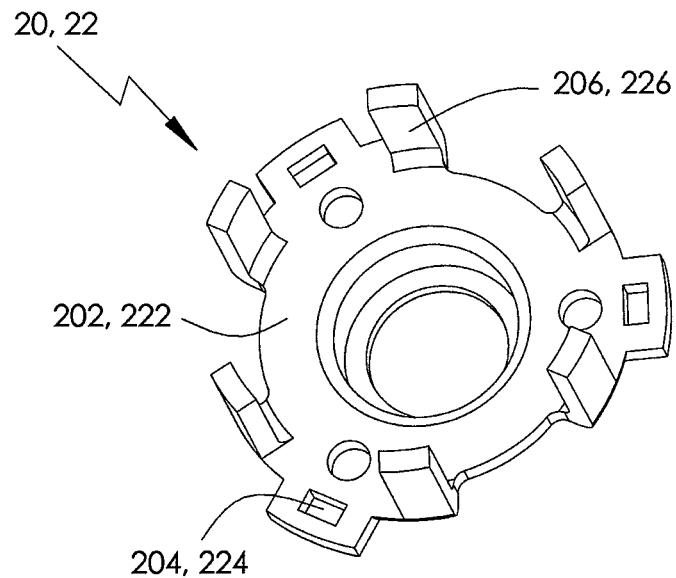
FIG. 3 is a view of one end cap of the motor.
Figure 4:
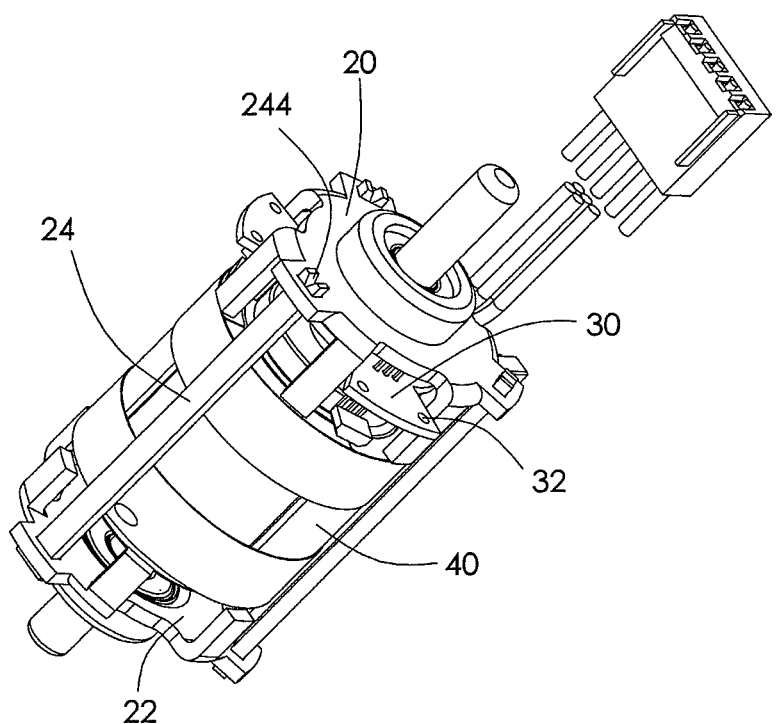
FIG. 4 shows the motor with a stator core and windings thereof removed.
Figure 5:
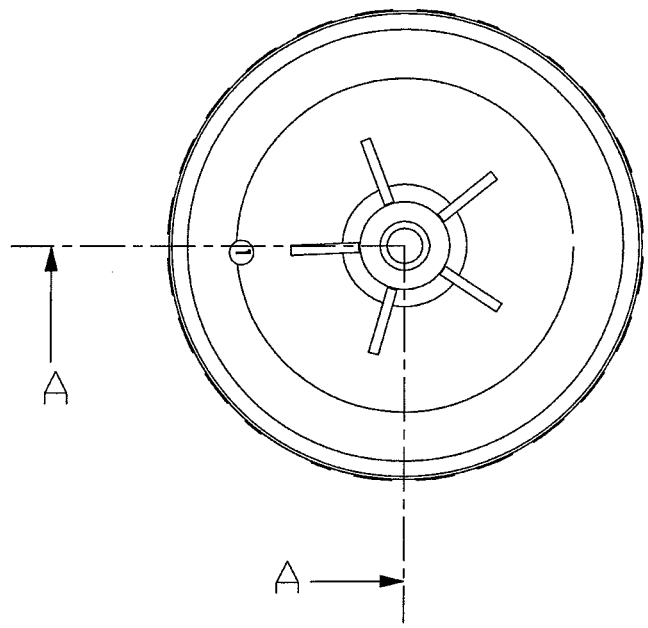
FIG. 5 is an end view of the motor.
Figure 6:
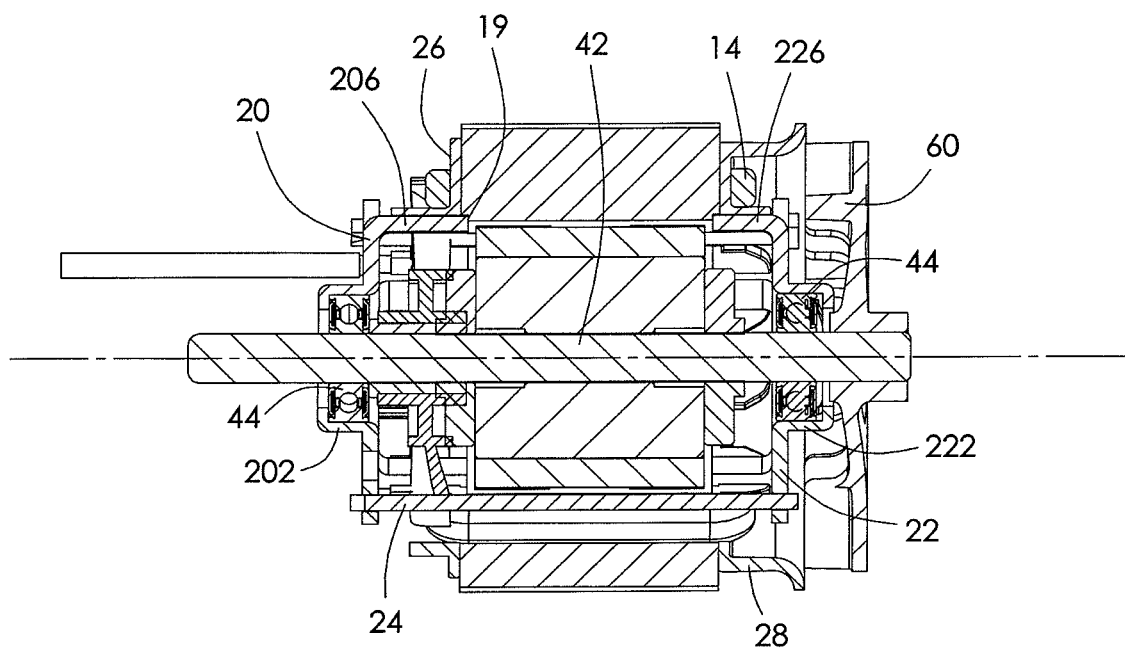
FIG. 6 is a sectional view of the motor taken along line A-A of FIG. 6.
Figure 7:
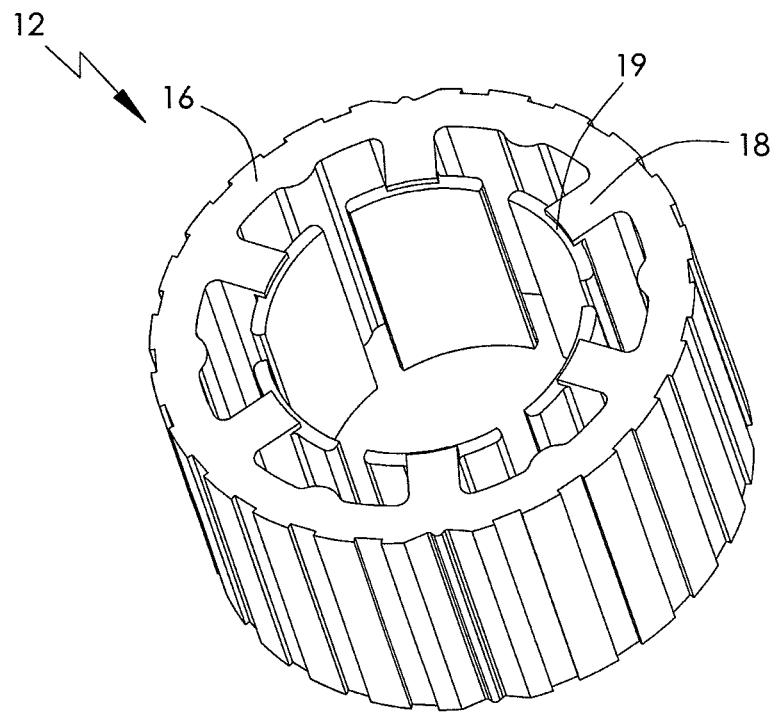
FIG. 7 shows the stator core of the motor.
Figure 8:
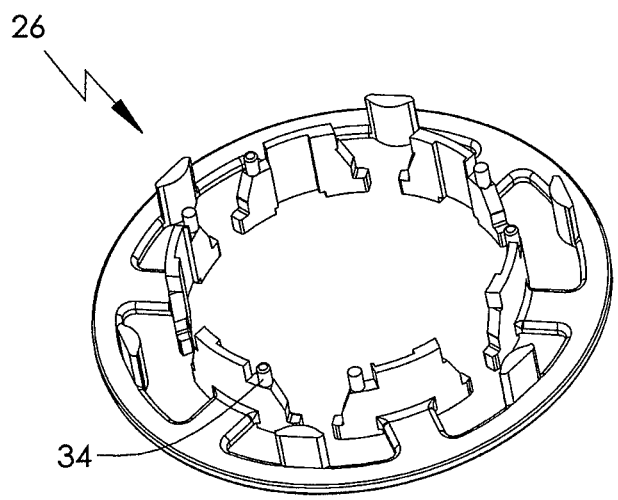
FIG. 8 shows a stator core end protector, being a part of the motor.

FIGS. 1 to 8 illustrate an electric motor according to a first embodiment of the present invention. The motor comprises a stator 10 and a rotor 40. The stator 10 comprises a stator core 12 and windings 14. The stator core 12 is made of magnetic material, for example but not limited to iron. The stator core 12 comprises a yoke 16 and a plurality of teeth 18 (shown in FIG. 7) extending inwardly from the yoke 16. The windings 14 are wound on the teeth 18. Slots 161 may be formed in the outer surface of the yoke 16 for increasing the heat dissipation of the surface of the yoke 16.

The stator 10 further comprises a pair of end caps 20 and 22 disposed at opposite axial ends thereof and a plurality of locking members 24 configured to secure or fix the end caps 20 and 22. The locking members 24 extend between the end caps 20 and 22 inside of the stator 10. Preferably, each of the locking members 24 extends from one end cap 20 to the other end cap 22 through a slot formed between adjacent teeth 18. Each end cap 20, 22 comprises a mounting portion 202, 222 with a through hole configured to mount therein a bearing 44 for rotatably supporting the shaft 42 of the rotor 40, and a plurality of extension portions extending radially and outwardly from the mounting portion 202, 222. Each extension portion defines a through opening 204, 224. In this embodiment, the locking members 24 are elongate locking pins. Each locking pin has a T-shaped end 242 (see FIG. 2) which has a size larger than that of the through opening 204, 224. The other end is bifurcated or forked. After the forked end of the pin 24 extends through the aligned through openings 204, 224 of the end caps 20 and 22, the is deformed to prevent withdrawal and securely fasten the end cap to the pin and thereby fix the end caps to the stator core. The pins 24 may be made of a metal material, for example Copper. Alternatively, the pins 24 may be made of a non-metal material, for example a thermoplastic plastics material.

Preferably, the extension portions of the end caps 20 and 22 are arranged uniformly in the circumferential direction of the end caps 20 and 22. Thus, the joints between the locking members 24 and the end caps 20 and 22 are respectively located at corners of a regular polygon such that the end caps 20 and 22 have a good effect on vibration reduction. In this embodiment, each end cap 20, 22 has three extension portions and joints between the locking members 24 and the end caps 20 and 22 are respectively located at corners of a regular triangle.

Each end cap 20, 22 also has a plurality of position parts 206, 226 axially bent from opposite sides of each of the extension portions. The distal end of each tooth 18 of the stator core 12 remote from the yoke 16 is sunk in the axial direction relative to other portions of the tooth 18, at the axial end faces, to form a step 19. The position parts 206, 226 of the end caps 20 and 22 abut against the corresponding steps 19 in the axial and radial directions to thereby locate the end caps 20 and 22.

The stator 10 further comprises a pair of end protectors 26 and 28 disposed at opposite ends of the stator core 12 and configured to insulate the stator core 12 from the windings 14 and a circuit board 30 disposed between one end cap 20 and the stator core. The circuit board 30 has through holes 32 and the end protector 26 has posts 34 inserted into the corresponding through holes 32. Alternatively, the end protectors 26 and 28 each may have a precise inner surface configured to locate the position parts 206, 226 of the end caps 20 and 22 in the radial direction. In this case, the steps 19 may be omitted with the axial end surfaces of the teeth 18 locating the position parts 206, 226 of the end caps 20 and 22 axially.

A fan 60 is mounted to one end of the shaft 42 of the rotor 40 and located outside of the end cap 22. Preferably, the fan 60 is a centrifugal blower. When rotating the fan 60 generates airflow passing through the inside of the stator to cool the stator core 12 and windings 14. Alternatively, the fan 60 may be an axial fan with an outer diameter greater than that of the stator core 12 such that one part of the airflow generated by the fan 60 may pass through the inside of the stator and another part of the airflow may flow over the outer surface of the stator core 12.

Figure 9:
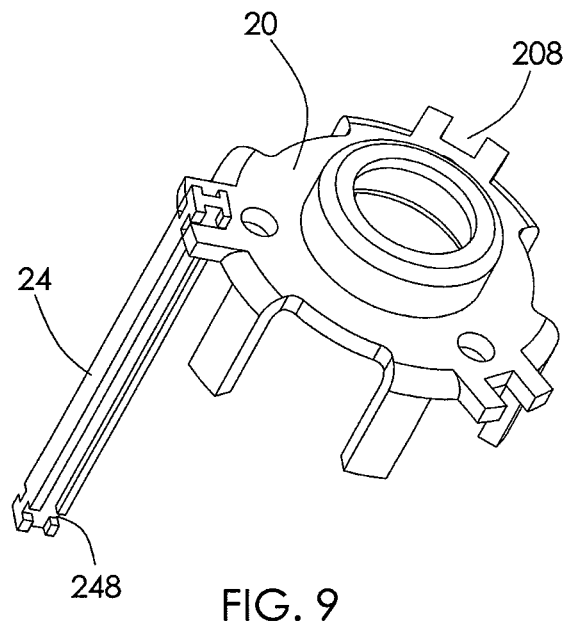
FIG. 9 shows a locking member fixed to an end cap in accordance with an alternative embodiment of the present invention.

Understandably, there may be many ways to fixing the locking members 24 to the end caps 20 and 22. For example, the locking member 24 may be a pin with forked ends formed at both ends thereof, or a pin with a T-shaped or cross-shaped head at one end and at the other end thereof deformable/elastic barbs which can deform when extending through the through holes 204, 224 of the end cap 20, 22 to engage with the corresponding end cap 20, 22. As shown in FIG. 9 (only one pin 24 and one end cap 20 shown for clarity), the end caps 20, 22 may have notches, cutouts, openings, apertures etc., at the radial end of each extension portion thereof, and the pins 24 may have locking slots 248 at the ends thereof. After the ends of the pins 24 are received at the openings 208 of the end caps 20 and 22, portions of the end caps 20 and 22 at opposite sides of the openings are deformed toward each other to be engaged in the corresponding locking slots 248 of the locking pins 24, to thereby fix the pins 24 with the end caps 20 and 22.

Understandably, the motor may be an electronically commutated motor or a universal motor.

Figure 10:
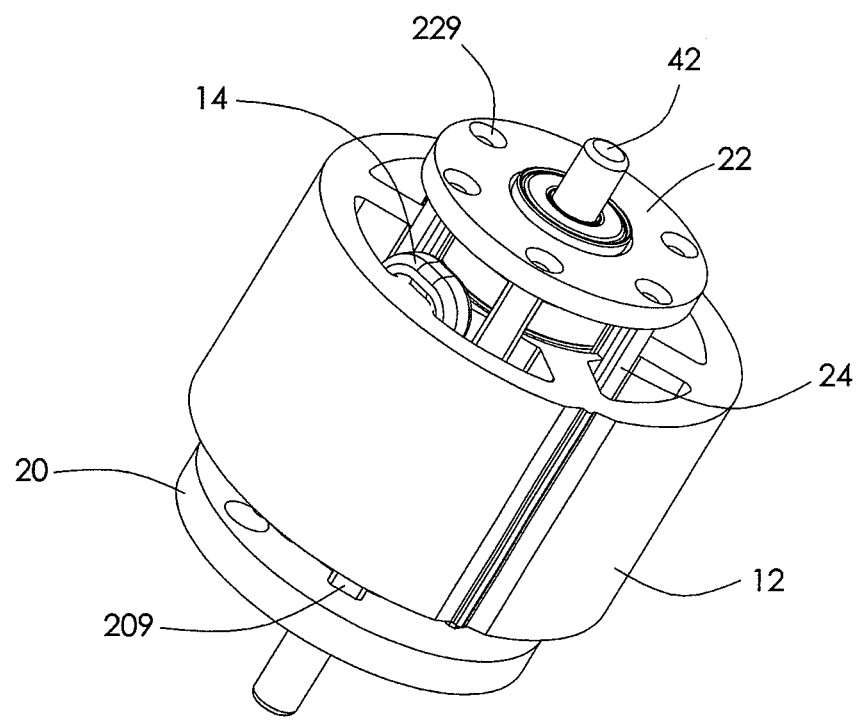
FIG. 10 shows an electric motor in accordance with another embodiment of the present invention.

FIGS. 10 to 13 show an electric motor in accordance with another embodiment of the present invention. FIG. 10 shows the assembled motor, while FIG. 11 shows the motor with the upper end cap removed and FIG. 12 shows the motor from the other end with both end caps removed. FIGS. 11 and 12 illustrate the attachment of a further modified locking pin and FIG. 13 shows the modified locking pin. In this embodiment, the stator comprises a stator core 12 and windings 14 wound on the stator core 12. The stator core 12 comprises a yoke 16 and a plurality of teeth 18 extending inwardly and radially from the yoke 16. Pole shoes 182 extending along the circumferential direction of the motor is formed at the inner end of each tooth 18. The windings 14 are respectively wound on the corresponding teeth 18. The stator further comprises a pair of end caps 20, 22 which are fixed via locking members 24. Preferably, the locking members 24 are elongate pins extending axially through gaps formed between the inner ends of the teeth 18. Each pin 24 has on opposite sides thereof an axial groove 242 for receiving the edges of the corresponding pole shoes 182. The pins 24 are located in the gaps formed between the pole shoes 182 of adjacent teeth 18 and do not occupy space within the slots formed between adjacent teeth 18 for receiving the windings 14 and therefore do not affect the size of the windings 14. Each pin 24 has a locking hole 244 in each of the ends thereof. The end caps 20, 22 have through holes 209, 229 corresponding to the locking holes 244 of the pins 24. Fasteners such as bolts (not shown) extend through the through holes 209, 229 of the end caps 20, 22 and engage with the corresponding locking holes 244 of the pins 24 to thereby lock the end caps 20, 22 with the pins 24 and thus fixing the end caps to the stator. Each locking pin 24 may have a pair of transverse position slots 249 in the opposite sides at one end thereof. Each position slot 249 communicates with one end of a groove 242 and is perpendicular to the groove 242. The position slots 249 of the pin 24 cooperate with the axial ends of the pole shoes 182 to precisely position the pin 24 in the axial direction.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. An electric motor comprising:
    a stator, including a stator core;
    a rotor, including a shaft, rotatably installed in the stator;
    a pair of end caps disposed at opposite axial ends of the stator core; and
    a plurality of locking members fixing the end caps with respect to the stator core, the locking members extending between the end caps and being disposed in gaps formed between the rotor and stator.

2. The motor of claim 1, wherein the rotor further comprises a fan attached to the shaft, the fan being disposed at one end of the stator outside the corresponding end cap.

3. An electric motor comprising a stator, including a stator core, a rotor, including a shaft, rotatably installed in the stator, a pair of end caps disposed at opposite axial ends of the stator core and a plurality of locking members fixing the end caps with respect to the stator core, the locking members extending between the end caps inside of the stator core, wherein the stator core comprises a yoke and a plurality of teeth extending inwardly from the yoke and the stator comprises windings, the windings being wound about respective teeth of the stator core and the locking members extending through slots formed between adjacent teeth.

4. The motor of claim 3, wherein the stator further comprises two end protectors disposed at opposite axial ends of the stator core for insulating the stator core from the windings.

5. The motor of claim 4, wherein the stator further comprises a circuit board disposed between one of the end caps and the corresponding end protector, the circuit board has through holes and the end protector has posts inserted in the corresponding through holes.

6. An electric motor comprising a stator, including a stator core, a rotor, including a shaft, rotatably installed in the stator, a pair of end caps disposed at opposite axial ends of the stator core and a plurality of locking members fixing the end caps with respect to the stator core, the locking members extending between the end caps inside of the stator core, wherein each end cap comprises a mounting portion and a plurality of extension portions extending from the mounting portion, the mounting portion defines a hole configured to mount therein a bearing for supporting the shaft of the rotor, and opposite ends of each locking member are respectively attached to the corresponding extension portions.

7. The motor of claim 6, wherein each extension portion of the end cap has an opening for fixedly receiving one end of the corresponding locking member.

8. The motor of claim 6, wherein joints between the locking members and the end caps are respectively located at corners of a regular polygon.

9. The motor of claim 6, wherein each end cap further comprises at least one position part bent from each of the extension portions, the position parts abutting a corresponding axial end of the stator core.

10. The motor of claim 9, wherein the axial ends of the stator core each form a step to position the corresponding position part in the axial and radial directions.

11. The motor of claim 1, wherein the motor is an electronically commutated motor or a universal motor.

12. The motor of claim 2, wherein the stator core has channels formed in an outer surface thereof and the fan is an axial fan with a diameter greater than that of the stator core such that a part of the air flow generated by the fan flows along the outer surface of the stator core.

13. The motor of claim 3, wherein the teeth have pole shoes formed at the inner ends thereof, the locking members being located in gaps formed between the poles shoes of adjacent teeth.

14. The motor of claim 13, wherein the locking members are elongate pins which have grooves in opposite sides thereof, edges of the pole shoes being received in corresponding grooves of the locking members.

15. The motor of claim 14, wherein the pins have at least one transverse position slot cooperating with an axial end of the pole shoe to position the pins in the axial direction of the motor.

16. The motor of claim 13, wherein the locking members have locking holes, the end caps have through holes corresponding to the locking holes and fasteners extend through the through holes and engage with the corresponding locking holes.

* * * * *